've
United States Patent

Hugonin

[15] 3,684,887
[45] Aug. 15, 1972

[54] APPARATUS FOR INSPECTING TUBULAR GOODS HAVING AN AUTOMATIC SHUTTER

[72] Inventor: Gerald H. Hugonin, Houston, Tex.

[73] Assignee: Schlumberger Technology Corporation, New York, N.Y.

[22] Filed: March 26, 1970

[21] Appl. No.: 22,933

[52] U.S. Cl. ............. 250/83.3 D, 250/52, 250/83 C, 250/105, 250/106 S
[51] Int. Cl. ............................................. G01t 1/17
[58] Field of Search ...... 250/83.3 D, 105, 106 S, 5 Z, 250/83 C

[56] References Cited

UNITED STATES PATENTS

| 3,066,254 | 11/1962 | Price et al. ...... 250/83.3 D UX |
| 3,483,375 | 12/1969 | Joffe et al. ....... 250/83.3 D UX |
| 3,229,094 | 1/1966 | Brys ..................... 250/83 C X |

Primary Examiner—Walter Stolwein
Assistant Examiner—Morton J. Frome
Attorney—Ernest R. Archambeau, Jr., Stewart F. Moore, David L. Moseley, Edward R. Roney, William R. Sherman and John P. Sinnott

[57] ABSTRACT

In the new and improved radiation apparatus disclosed herein for inspecting tubular goods, a radiation detector is coaxially positioned within a tubular member being axially translated along a selected inspection axis for receiving radiation from a radiation emitter facing the detector and mounted in a body rotating around the exterior of the tubular member. One or more radiation-attenuating devices or shutters are cooperatively arranged in the rotating body for regulating the intensity of radiation imposed on the detector. Uniquely-arranged controls are provided for selectively positioning the shutters as tubular members that are to be inspected move along the inspection axis, with these controls being adapted for operation without interrupting the rotation of the body carrying the shutters.

11 Claims, 4 Drawing Figures

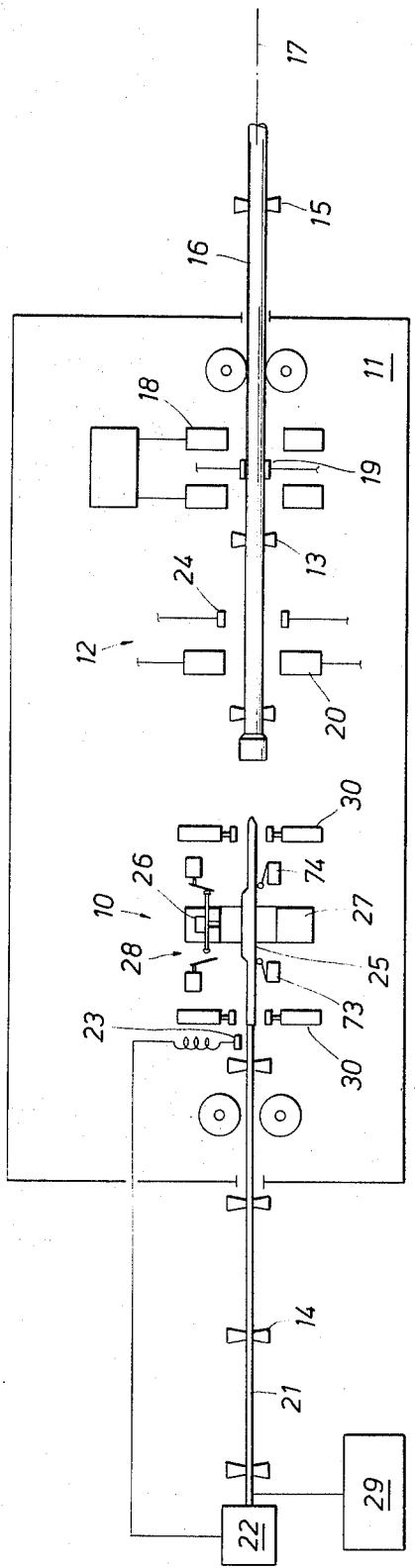

Gerald H. Hugonin
INVENTOR

BY
ATTORNEY

APPARATUS FOR INSPECTING TUBULAR GOODS HAVING AN AUTOMATIC SHUTTER

Elongated tubular goods, such as oil-field piping or tubing and the like, are frequently inspected for hidden flaws and other latent defects that might cause failure of such tubular members while in service. As one aspect of such inspections, it is often desired to also obtain representative measurements of wall thickness of such tubular members at spaced points along their length. Various thickness-measuring devices have, of course, been devised heretofore for inspecting long lengths of pipe and tubing. For instance, the new and improved inspection device disclosed in a copending patent application (Ser. No. 744,861) assigned to the present assignee has been found to provide accurate thickness measurements of various tubular goods at efficient inspection rates. As described in that application, a radiation detector is mounted on the free end of a fixed, but relatively flexible, elongated lance that is aligned along a selected inspection axis and adapted to receive a tubular member being moved axially along the axis. A radiation source is suitably mounted within an annular member adapted for rotation at high speeds around the exterior of a tubular member moving along the inspection axis.

Although this new and improved inspection apparatus has proven to be successful in certain situations, it has been found that where typical oil-field tubular goods are being inspected, the efficiency of this apparatus is significantly improved where the radiation means used therewith produce a substantial count rate at the detector in the order of $10^6$ to $20^6$ counts per second as a tubular member is being inspected. With count rates of this magnitude, it will be appreciated that the detector will be operate at optimum statistical accuracy so that pipes can be moved through the inspection apparatus at reasonably-high axial speeds without unduly compromising the accuracy of the resulting thickness measurements.

To produce such high count rates while there is an intervening pipe wall between the radiation means and the detector will, of course, cause the detector to be subjected to much-greater count rates when a pipe is not positioned between the radiation source and the detector. It has been found, however, that with even the highest-quality radioactivity detectors, the prolonged exposure of the detector to such greatly-increased count rates will rapidly cause the detector to begin drifting; and that this drift or error is accelerated at an exponentially-increasing rate so long as the exposure is continued. Moreover, it has been found that even brief direct exposures of even a high-quality radioactivity detector to such greatly-increased count rates will quickly initiate unreliable or unstable operation of the detector which will not be corrected until the detector has been reinserted into a pipe for a considerable period of time. Such unpredictable operation of the detector will, of course, either result in unreliable measurements being obtained or make it necessary to delay the inspection of another pipe until the detector has again stabilized.

Accordingly, it is an object of the present invention to provide new and improved radiation apparatus for inspecting axially-moving tubular members in which the operation of the radiation detector and source employed therewith is selectively regulated for providing more-accurate measurements but without limiting the efficiency of the operation of the inspection apparatus.

These and other objects of the present invention are attained by arranging radiation-emitting means in a body adapted to be rotated around a tubular member moving axially along a selected axis for laterally directing radiation through at least one wall of such a member and toward radiation-detecting means spatially disposed from the radiation-emitting means. Radiation-controlling shutter means are movably positioned in the rotating body and cooperatively arranged with selectively-operable control means for subjecting the radiation-detecting means to the full intensity of the radiation-emitting means only when a tubular member is interposed between the radiation means. Upon removal of a tubular member from the inspection apparatus, the control means selectively move the shutter means to another position as the body continues to rotate for reducing the intensity of radiation imposed on the radiation-detecting means to a selected level without slowing the inspection operation.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 schematically illustrates thickness-measuring apparatus employing the present invention as this apparatus may be arranged for cooperation with typical flaw-inspection apparatus;

FIG. 2 is an elevational view showing a preferred arrangement of the present invention adapted for use with the thickness-measuring apparatus depicted in FIG. 1;

Figure 3:
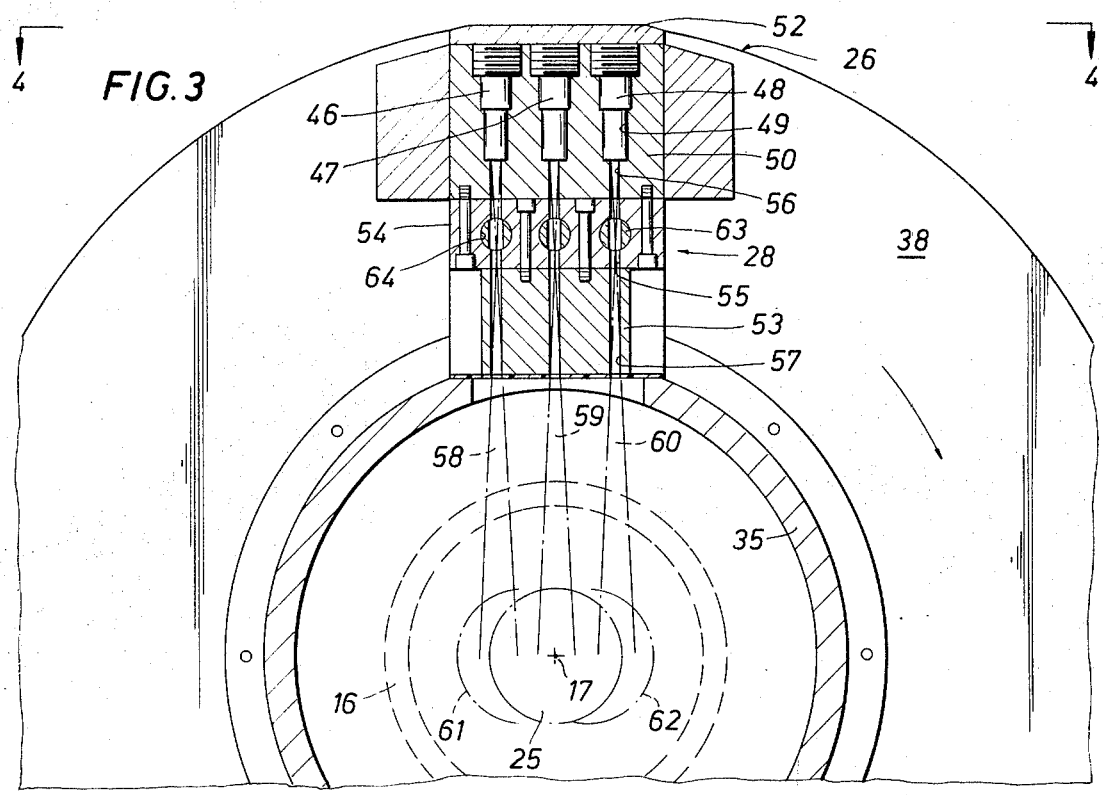
FIG. 3 is an enlarged cross-sectional view taken along the lines 3—3 in FIG. 2 and depicts a preferred embodiment of radiation shutter means arranged for use with the present invention.

Turning now to FIG. 1, a schematic plan view is shown of thickness-measuring apparatus 10 incorporating a preferred embodiment of the present invention and operatively mounted within a vehicle 11. To illustrate a typical situation in which the new and improved apparatus 10 can be advantageously used, the thickness-measuring apparatus is depicted as being axially aligned with other pipe-inspection apparatus 12 such as the flaw-inspection apparatus disclosed in the Tompkins U.S. Pat. No. Re. 26,537. As is typical, the thickness-measuring apparatus 10 includes pipe-translating means, such as a selectively-powered conveyor 13 (which may be the conveyor shown in U.S. Pat. No. 3,565,310 issued Feb. 23, 1971 mounted within the vehicle 11 and a pair of portable conveyors 14 and 15 (such as those disclosed in U.S. Pat. No. 3,250,404) arranged at the opposite ends of the vehicle, for selectively moving pipe sections, as at 16, back and forth through the vehicle along a generally-horizontal inspection axis 17.

Reference should be made, of course, to the aforementioned Tompkins patent for elaboration of the details of the flaw-inspection apparatus 12 and the particulars of its operation. However, the general arrangement of the flaw-inspection apparatus 12 and a typical inspection operation therewith should be understood to better appreciate its cooperation with the new and improved apparatus 10. In general, therefore, the flaw-inspection apparatus 12 is arranged to first progressively induce a longitudinally-oriented magnetic flux in a horizontal pipe, as at 16, being advanced axially in a first direction along the conveyor 13 so that transversely-oriented flaws in the pipe can be concurrently detected. Residual magnetism remaining in the pipe 16 is at least partially reduced by progressively subjecting the advancing pipe to a demagnetizing flux after it has been inspected for transversely-oriented flaws. When the pipe 16 is also to be inspected for longitudinally-oriented flaws, the pipe is moved onto the conveyor 14 and, after being halted, subjected to a circumferentially-oriented magnetic field. Thereafter, as the pipe 16 is returned in the opposite direction along the inspection axis 17, it is progressively inspected for longitudinally-oriented flaws. On the other hand, when this latter inspection is not performed, the pipe 16 is merely returned back through the vehicle 11 to the conveyor 15. In either situation, however, it is preferred that the new and improved thickness-measuring apparatus 10 be arranged for operation upon the return movement of the pipe 16 whether or not the latter flaw inspection is conducted.

To perform these inspections for transverse flaws, the inspection apparatus 12 preferably includes an annular coil 18 having spaced sections concentrically arranged around the inspection axis 17 with a plurality of flux-detecting heads 19 arranged therebetween. A second annular coil 20 is also concentrically arranged around the inspection axis 17 to the rear of the flux-inducing coil 18 and connected to a suitable AC or pulsating DC source (not shown) for progressively demagnetizing the pipe 16 as it leave the flux-inducing coil.

The flaw-inspection apparatus 12 further includes an electrically-conductive, cantilevered elongated probe or lance 21 that is supported at its remote end and maintained in substantially-coincidental alignment along the inspection axis 17. When the pipe 16 is to be inspected for longitudinal flaws, it is advanced onto the lance 21 and halted when the lance has passed completely through the pipe and its free end projecting out of the rearward end of the pipe. To subject the pipe 16 to a circumferentially-oriented magnetic field, a DC source 22 is connected between the remote supported end of the lance 21 and one or more laterally-movable electrical contacts 23 that are selectively engageable with the free end of the lance. Thereafter, as the pipe 16 is being returned, a plurality of flux-detecting heads 24 are selectively moved into contact with and coaxially rotated about the moving pipe for detecting generally-longitudinal flaws therein. As previously mentioned, it is preferred to operate the new and improved thickness-measuring apparatus 10 as the pipe 16 is withdrawn from over the lance 21 whether or not the pipe is to be inspected for longitudinal flaws.

Although the present invention is equally suited for use with the inspection unit described in the aforementioned copending application, Ser. No. 744,861, the present invention is especially adapted for use with the new and improved inspection unit disclosed and claimed in two copending applications Ser. No. 22,932 and Ser. No. 22,935 filed simultaneously herewith. Accordingly, as depicted in FIG. 1, the thickness-measuring apparatus 10 is comprised of radiation-detecting means including a radiation detector 25 operatively positioned along the axis 17 and radiation means 26 mounted on a body 27 adapted for rotation about the inspection axis and cooperatively arranged for directing one or more inwardly-directed beams of radiation through the wall of the pipe 16 for interception by the radiation detector. As will subsequently be explained, selectively-controlled shutter means 28 of the present invention are cooperatively arranged with new and improved circuitry 29 and one or two selectively-operable detector-positioning clamps, as at 30, which are cooperatively arranged as described in the two simultaneously-filed applications for checking the accuracy of the detector 25 before each inspection operation.

As illustrated in FIG. 2, the radiation detector 25 is a typical radioactivity detector, such as an ionization chamber or a scintillation detector, which is mounted in a suitable enclosed protective housing 31 that is carried on the free end of the elongated probe 21. To adapt the detector 25 for movement relative to the lower internal wall of the pipe 16 as it is axially advanced or returned along the inspection axis 17, the protective housing 31 includes a central tubular portion 32 of nylon, or the like, that will not significantly attenuate incident radiation. A plurality of removable centralizing members, as at 33 and 34, are spaced circumferentially about the end portions of the detector housing 31 for retaining the detector 25 in general coincidental alignment with the inspection axis 17. As a matter of convenience, the centralizers 33 and 34 are adapted to be readily exchanged with other members (not shown) of greater or lesser heights so that the new and improved inspection apparatus 10 will be effective for inspecting a wide range of sizes of tubular members. As will be subsequently explained, by arranging the radiation means 26 to produce discrete beams of radiation that are each of a reduced transverse width somewhat less than that of the effective portion of the detector 25 and distributing these beams at predetermined intervals across the plane of rotation, the radiation detector will produce a uniform output signal even when it is eccentrically disposed in relation to the inspection axis 17.

In the preferred embodiment of the thickness-measuring apparatus 10, the radiation-detector 25 is mounted on the free end of the lance 21 and coaxially positioned within the rotating body 27 which includes a horizontal, generally-tubular member 35 having one end portion rotatably journalled within an enlarged, annular stationary housing 36 and adapted for high-speed rotation around the longitudinal inspection axis 17. The radiation means 26 are eccentrically located between two longitudinally-spaced annular plates or flanges 37 and 38 secured to the unsupported or other end portion of the rotatable member 35. To dynamically balance the rotating body 27, a target 39 of sufficient mass is mounted between the spaced flanges 37 and 38 diametrically opposite of the radiation means 26.

As best seen in FIG. 2, the rotating body 27 is concentrically arranged about the horizontal inspection axis 17 and journalled within the housing 36 by a pair of longitudinally spaced bearings 40 and 41 carrying the supported end portion of the tubular member 35. In one manner of driving the rotating body 27 at high speeds about its rotational axis 17, the supported end of the tubular member 35 is extended beyond the outboard bearing 40 and coupled to driving means, such as a motor 42 mounted outside of the housing 36, by a suitable power transmission such as a typical chain or belt 43 operatively interconnecting a pulley 44 mounted on the tubular member and a pulley 45 mounted on the shaft of the motor.

Turning now to FIG. 3, the radiation means 26 include an array of three isotropic radiation sources 46–48 (such as Cobalt 60, Cesium 137, or other acceptable sources of gamma radiation) which are respectively encased in typical source cups each having an opening in its lower end. The encased radiation sources 46–48 are respectively disposed within one of three chambers, as at 49, formed side-by-side in the upper portion of a block 50 of a suitable radiation-attenuating or shielding material. To fully enclose the sources 46–48, a removable closure member, as at 51, is fitted into the open end of each of the source chambers 49 and a suitable cover plate 52 is secured to the shielding block 50 over each of the closure members.

As best seen in FIG. 3, a second block 53 formed of steel, tungsten, lead or some other suitable radiation-attenuating or shielding material is mounted between the annular flanges 37–38 and spaced radially inwardly from the shielding block 50 and diametrically opposite from the target shield 39 (FIG. 2). The shutter means 28 include a third block 54 of radiation-shielding material mounted between the shielding block 50 and the focussing block 53 and having three generally-parallel radiation passages, as at 55, which are respectively aligned with three corresponding radiation passages, as at 56 and 57, respectively formed in the first and second blocks. As explained in greater detail in the aforementioned simultaneously-filed applications and of paramount significance to the present invention, the shutter means 28 are uniquely arranged for selectively controlling the passage of radiation from the sources 46–48 to the detector 25 as the body 27 is rotating about the axis 17.

It will be noted from FIG. 3 that the radioactive sources 46–48 are uniquely arranged so that separate, generally-parallel beams of radiation 58–60 are directed along a selected transverse plane intersecting the inspection axis 17. In particular, the radiation means 26 are arranged so that two of the three radiation beams 58 and 60 are respectively directed on opposite sides of the axis 17 and the third beam of radiation 59 will intersect the inspection axis. Accordingly, when the detector 25 is in position and coincidentally aligned with the inspection axis 17, the radiation beam 59 from the central radioactive source 47 will be directly impinged on the detector and the flanking beams of radiation 58 and 60 will substantially straddle the detector. On the other hand, as schematically depicted by the dashed circles 61 and 62, should the detector 25 be shifted laterally to either side of the inspection axis 17, the active portion of the detector will progressively receive more radiation from one or the other of the two flanking beams 58 (or 60) and correspondingly receive a lesser amount of radiation from the central beam 59.

Accordingly, as explained in greater detail in the copending application Ser. No. 22,932, by selecting a given strength for the central radioactive source 47, so long as the detector 25 remains coincidentally aligned with the inspection axis 17, the maximum energy from the central radioactive source sill be received thereby so as to produce the maximum output. On the other hand, lateral movement of the detector 25 to either one side or the other of the inspection axis 17 will progressively diminish the amount of radiation being received from the central source 47 by the detector and produce a correspondingly-reduced output signal. The same results will, of course, be obtained for each of the two flanking sources 46 and 48.

Accordingly, by selecting the sources 46 and 48 to have equal but lesser strengths than the central sources 47 and cooperatively arranging the two flanking radioactive sources in the manner depicted in FIG. 3, as the detector 25 shifts to one side or the other of the inspection axis 17, the detector will be irradiated by a combination of one of the two flanking radiation beams, for example the left-hand beam 58, as well as the central radiation beam 59. Thus, as the detector 25 moves further to the left, the progressively-increasing signal produced by the weaker radioactive source 46 will be added to the progressively-diminishing signal produced by the central radioactive source 47 so as to produce a combined output that is substantially constant. The same response will, of course, be obtained whenever the detector 25 shifts to the right-hand side of the inspection axis 17 except that the right-hand radioactive source 48 will produce a progressively-greater output signal as the output signal contributed solely by the central radioactive source 47 progressively diminishes. It will, of course, be appreciated that the strengths of the two flanking sources 46 and 48 are cooperatively selected in accordance with their lateral spacing from the central source 47 to obtain the additional intensity to make the combined output substantially constant across the range of lateral movements of the detector 25.

It will be appreciated, therefore, that the radiation means 26 will produce a substantially-uniform output signal for a given thickness of metal between the radiation sources 46–48 and the detector 25 so as to at least minimize the effects which would otherwise be caused by even the slightest lateral shifting of the detector within the pipe 16. It should also be noted that even though the detector 25 may bounce upwardly and downwardly as the pipe 16 is being moved thereover, the radiation means 26 will also provide substantially-uniform signals over an acceptable range of vertical movement of the detector inasmuch as the radiation beams 58–60 are well collimated and the sides of each beam is relatively parallel so that the flux density of each beam will be substantially equal at different vertical positions within the range of vertical movement of the detector. Thus, the vertical movements of the detector 25 are usually within a range where the axes of the radiation beams 58–60 can be perfectly parallel and still maintain a substantially-equal flux density within this range.

Figure 4:
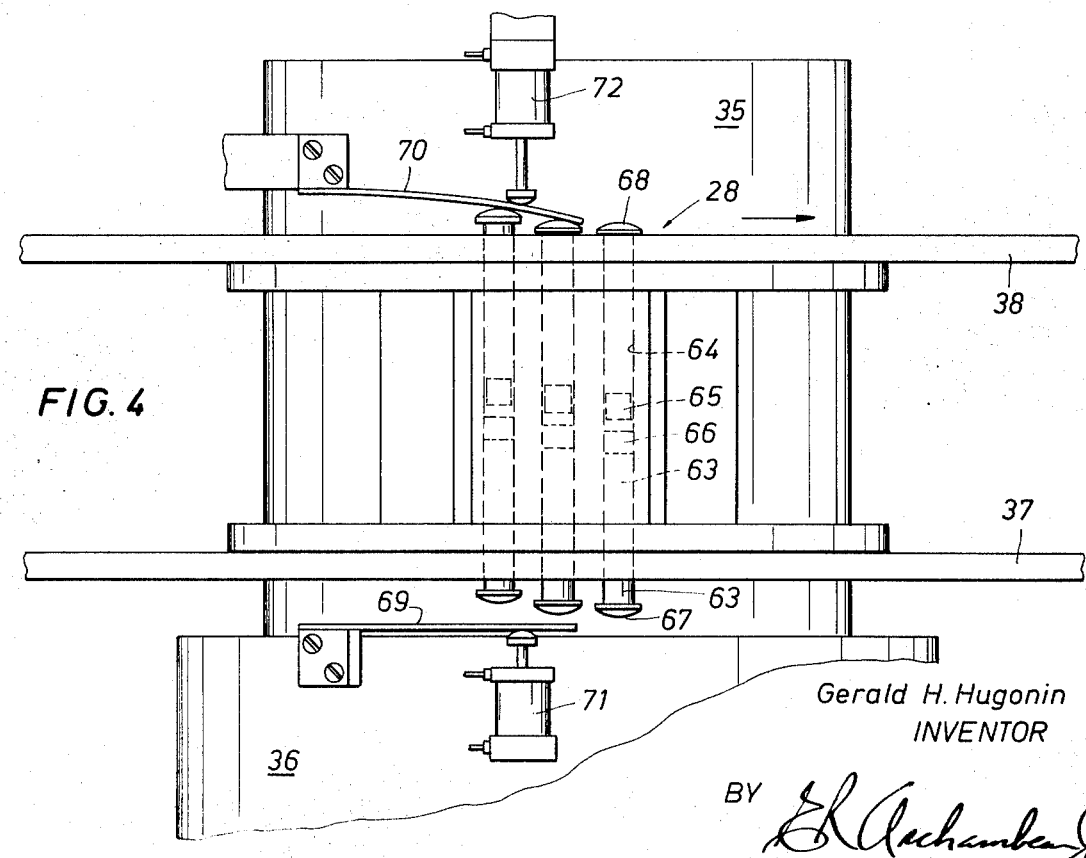
FIG. 4 shows further details of a preferred embodiment of the present invention.

Referring now to FIGS. 2–4, it will be noted that the shutter means 28 include three elongated rods, as at 63, that are respectively arranged for sliding movement within complementary passages 64 formed in the block 54 and respectively intersecting the radiation passages 55 therein. In the preferred embodiment of the shutter means 28 of the present invention, these intersecting passages 64 are parallel to the inspection axis 17 and the elongated rods 63 are of sufficient length that they will project outwardly from the forward and rearward faces of the flanges 37 and 38.

As best seen in FIGS. 2 and 4, each of these bars 63 are provided with a first portion having a transverse port, as at 65, formed therein of a similar or identical cross section as the radiation passages 55 and through which radiation may readily pass when these transverse openings are in registration with the radiation passages 55. It will be noted that in accordance with the invention defined in the copending application Ser. No. 22,935, a second portion, as at 66, of each of the bars 63 is formed to have a thickness of a selected and predetermined magnitude so that upon movement of the bars to position these reduced portions in alignment with the radiation passages 55, the radiation intercepted by the radiation detector 25 will be reduced to produce a selected count rate at the detector.

The shutter means 28 of the present invention include means for selectively moving the shutter rods 63 to bring their respective openings 65 into registration with the radiation passages 55 just as the leading end of the pipe 16 approaches the detector 25 and then repositioning the rods to bring their respective obturating portions 66 back into the radiation passages 55 as the trailing end of the moving pipe passes over the detector, with these movements being accomplished as the body 27 continues to rotate. It will be appreciated, therefore, that these alternately-directed movements of the shutter bars 63 between their respective positions will assure that the detector 25 will be protected from exposure to excessive radiation intensities that could otherwise create the aforementioned problems with unstability or drifting of the detector. Moreover, by positioning the shutter bars 63 as the body 27 rotates, the new and improved inspection apparatus 10 can be operated at maximum efficiency.

In the preferred embodiment of the shutter means 28, these alternately-directed movements of the shutter bars 63 are accomplished by mounting rounded knobs, as at 67 and 68, on the outer ends of each of the rods. Since the rods 63 will follow approximately the same circular path upon rotation of the rotating body 27, camming means, such as straps as at 69 and 70 (FIG. 4) of a relatively-flexible material are respectively secured to the forward and rearward portions of the housing 36 and operatively arranged for pivotal movement from first positions away from the housing to second positions immediately adjacent thereto which respectively intercept the paths of rotation of the forward and rearward knobs 67 and 68. The shutter means 28 of the present invention further include selectively-operable solenoid actuators 71 and 72 which are arranged adjacent to the straps 69 and 70, respectively, and so located that, upon energization of the first actuator 71, the strap 69 will be moved into the rotational path of the knobs 67 and will accordingly shift the shutter rods 63 to the position illustrated in FIG. 2 before the rotating body 27 completes a full revolution. Conversely, by energizing the second actuator 72, the shutter rods 63 will be quickly shifted in the reverse direction to their alternate position for opening the radiation passages 55. In the preferred embodiment of the shutter means 28, the selective operation of the solenoid actuators 71 and 72 is accomplished by arranging typical limit switches, as at 73 and 74 in FIG. 1, for contact by the pipe 16 as it passes along the conveyor 13 to shift the shutter rods 63 back and forth in proper coordination with the operation of the thickness-measuring apparatus 10.

To employ the thickness-measuring apparatus 10 including the new and improved selectively-controlled shutter means 28 of the present invention, a pipe, as at 16, is placed on the conveyor 15 and advanced (to the left as viewed in FIG. 1) along the conveyor 13 and over the elongated lance 21 at the opposite end of the vehicle 11. It will, of course, be appreciated that if the flaw-inspection apparatus 12 is being operated, the first inspection to be made with this apparatus will be performed as the pipe 16 passes along the conveyor 13.

In any event, once the pipe 16 is on the conveyor 14 and has passed the detector 25, the pipe is momentarily halted and the clamping devices 30 are actuated as shown in FIG. 2. At this point, the shutter bars 63 will be in their radiation-blocking positions to at least reduce the intensity of the radiation intercepted by the detector 25. Thus, as fully explained in the simultaneously-filed application Ser. No. 22,935, the obturating portions 66 of the shutter bars 63 will provide a constant output signal from the detector 25 which serves as a reference signal for calibrating the apparatus 10.

Once this reference signal is obtained, the clamping devices 30 are operated to move their respective clamps, as at 75 and 76, out of the path of the pipe 16 and the pipe is returned back along the conveyor 13 through the rotating body 27. As best seen in FIG. 4, as the leading end of the pipe 16 nears the thickness-measuring apparatus 10, the actuator 72 will be operated for successively shifting the shutter bars 63 to bring their ports 65 into alignment with the radiation passages 55 before the rotating body 27 completes a full revolution.

As the pipe 16 passes through the rotating body 27, one wall of the pipe will be interposed between the radiation means 26 and the detector 25 to produce a varying signal representative of the thickness of each incremental portion of the pipe wall being progressively scanned by the radiation beams 58–60. This varying signal will be combined by the circuitry 29 with the previously-obtained calibration signal to provide an output signal from the detector 25 that is representative of the differences between the known thickness of the obturating portions 66 of the shutter bars 63 and the wall thicknesses of the pipe 16. Once the trailing end of the pipe 16 clears the detector 25, the actuator 71 is operated to reposition the obturating portions 66 of the shutter bars 63 into alignment with the radiation passages 55 for again reducing the intensity of radiation to an acceptable level. The thickness-measuring apparatus 10 is then in readiness for accepting another pipe once the pipe 16 is removed from the conveyor 15.

It will be appreciated, therefore, that the present invention has provided new and improved apparatus for accurately and quickly measuring the wall thickness of elongated tubular members. By arranging the new and improved shutter means of the present invention for selectively blocking one or more narrowly-focussed beams of radiation which are directed toward the radiation detector, a calibration signal can be obtained without having to discontinue rotation of the radioactive source.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Apparatus adapted for inspecting an elongated tubular member and comprising: conveyor means adapted for axially translating an elongated tubular member along a selected longitudinal axis; radiation-detecting means including a radiation detector disposed generally along said axis and adapted for insertion into a tubular member being moved along said conveyor means toward said radiation detector to receive radiation directed theretoward; radiation-emitting means including a body adapted for rotation about said axis and having a passage therein directed inwardly toward said radiation detector, a radiation source operatively arranged on said rotatable body in relation to said passage for directing a beam of radiation inwardly therethrough toward said radiation detector, and means operatively arranged for rotating said rotatable body about said axis to progressively sweep said beam of radiation around said radiation detector; radiation-controlling means including a member operatively arranged on said rotatable body for movement relative thereto between first and second positions, said movable member having one portion adapted to be aligned with said passage upon movement thereof to its said first position for attenuating said beam of radiation to a selected level of intensity; actuating means mounted adjacent to said rotatable body and operatively arranged for selectively shifting said movable member between its said positions upon rotation of said rotatable body; and control means operatively arranged between said actuating means and said conveyor means for operating said actuating means to shift said movable member to its said first position in response to movement of a tubular member in a selected direction along said conveyor means.

2. The apparatus of claim 1 wherein said control means are further adapted for operating said actuating means to shift said movable member to its said second position in response to movement of a tubular member in the other direction along said conveyor means.

3. The apparatus of claim 2 wherein said movable member has another portion thereof with an opening therethrough adapted to be aligned with said passage upon movement of said movable member to its said second position, said opening being no smaller than said passage so that said beam of radiation will not be significantly attenuated so long as said movable member is in its said second position.

4. The apparatus of claim 3 wherein the range of movement of said movable member is defined by its said positions so that shifting of said movable member from either of its said positions will carry it to the other of its said positions.

5. The apparatus of claim 3 wherein said control means are further adapted for operating said actuating means to shift said movable member to its said second position only when said radiation detector is inserted into a tubular member moving along said conveyor means and for operating said actuating means to shift said movable member to its said first position when said radiation detector is not inserted in a tubular member moving along said conveyor means.

6. The apparatus of claim 1 wherein said movable member has an end portion projecting outwardly from said rotatable body which, upon rotation of said rotatable body, is carried in a predetermined circular path about said axis; and said actuating means include a contact member adapted for movement into and out of said circular path, and means operatively arranged between said contact member and said control means for selectively moving said contact member into said circular path to contact said end portion upon rotation thereof into engagement with said contact member and shift said movable member to its said first position.

7. Apparatus adapted for inspecting an elongated tubular member and comprising: conveyor means adapted for axially translating an elongated tubular member along a selected longitudinal axis; radiation-detecting means including a radiation detector disposed generally along said axis and adapted for insertion into a tubular member being moved along said conveyor means toward said radiation detector to receive radiation directed theretoward; radiation-emitting means including a body adapted for rotation about said axis and having a first passage therein directed inwardly toward said radiation detector, a radiation source arranged in said first passage for directing a beam of radiation inwardly therethrough toward said radiation detector, and means operatively arranged for rotating said rotatable body about said axis to progressively sweep said beam of radiation around said radiation detector; radiation-controlling means including a second passage in said rotatable body extending therethrough between the forward and rearward faces of said rotatable body and intersecting said first passage between said radiation source and the end of said first passage facing said radiation detector, and a member slidably arranged in said second passage and having first and second end portions extending beyond said forward and rearward faces, said slidable member having a first intermediate portion adapted to be in alignment with said first passage upon movement of said slidable member to a first position in relation to said rotatable body for attenuating said beam of radiation to a selected level of intensity, said slidable member having a second intermediate portion with an opening therethrough adapted to be in alignment with said first passage upon movement of said slidable member to a second position in relation to said rotatable body for passing said beam of radiation therethrough; actuating means including first and second contact members fixed in relation to said rotatable body and respectively adapted for movement into the circular paths of rotation described by said first and second end portions of said slidable member upon rotation of said rotatable body, movement of said first contact member into said path of rotation of said first end portion being operative for shifting said slidable member to its said first position upon rotation of said first end portion into engagement with said first contact member, and movement of said second contact member into said path of rotation of said second end portion being operative for shifting said slidable member to its said second position upon rotation of said second end portion into engagement with said second contact member; and control means operatively arranged between said actuating means and said conveyor means for selectively moving said first contact member into said path of rotation of said first end portion in response to movement of a tubular member along said conveyor means away from said radiation detector and for selectively moving said second contact member into said path of rotation of said second end portion in response to movement of a tubular member along said conveyor means toward said radiation detector.

8. The apparatus of claim 7 wherein said second passage is substantially parallel to said longitudinal axis.

9. The apparatus of claim 7 wherein said first passage is radially directed toward said longitudinal axis and said second passage is substantially parallel to said longitudinal axis and perpendicularly intersects said first passage.

10. The apparatus of claim 7 wherein said first and second contact members are flexible straps, and said actuating means further include first and second actuators including first and second reciprocating members respectively adapted for engagement with said first and second straps for urging said straps into said paths of rotation upon operation of said first and second actuators.

11. The apparatus of claim 7 wherein said first intermediate portion of said slidable member has a known thickness; and further including: first signal means coupled to said radiation detector and operable only when said slidable member is in its said first position for producing a first signal representative of said known thickness; and second signal means coupled to said radiation detector and operable only when said slidable member is in its said second position for producing a succession of second signals representative of the wall thicknesses along successive portions of a tubular member moving along said conveyor means over said radiation detector.

* * * * *